United States Patent [19]

Kimura et al.

[11] Patent Number: 4,837,096
[45] Date of Patent: Jun. 6, 1989

[54] SEMICONDUCTIVE OR CONDUCTIVE POLYMERS, METHOD OF PRODUCING THE SAME AND BATTERIES USING THE POLYMERS AS ACTIVE MATERIALS

[75] Inventors: Okitoshi Kimura, Tokyo; Toshiyuki Ohsawa, Kawasaki; Toshiyuki Kabata, Yokohama; Hiroshi Nishihara, Tokyo; Kunitsugu Aramaki, 2-23-26 Okusawa, Setagaya-ku, Tokyo, all of Japan

[73] Assignees: Ricoh Company, Ltd.; Kunitsugu Aramaki, both of Tokyo, Japan

[21] Appl. No.: 111,727

[22] Filed: Oct. 23, 1987

[30] Foreign Application Priority Data

Oct. 25, 1986 [JP] Japan ............................ 61-254393
Feb. 17, 1987 [JP] Japan ............................ 62-034036
Feb. 17, 1987 [JP] Japan ............................ 62-034037

[51] Int. Cl.$^4$ .................. H01M 4/60; C25B 3/00; C08G 75/00
[52] U.S. Cl. ................... 429/213; 204/72; 528/380; 528/417; 528/423; 252/500; 252/518; 252/519
[58] Field of Search ............... 429/213; 204/72; 252/182.1, 500; 528/380, 417, 423

[56] References Cited

U.S. PATENT DOCUMENTS 4,321,114 3/1982 MacDiarmid et al. ......... 429/213 X
4,502,980 3/1985 Denisevich et al. ............. 252/500
4,505,841 3/1985 Denisevich ...................... 252/500
4,519,938 5/1985 Papir ............................... 252/500
4,624,761 11/1986 Lando ........................... 252/500 X

FOREIGN PATENT DOCUMENTS 182548 5/1986 European Pat. Off. .

Primary Examiner—Stephen J. Kalafut
Attorney, Agent, or Firm—Oblon, Fisher, Spivak, McClelland & Maier

[57] ABSTRACT

Polymers having repeat units represented by formula (Ia) in the main chain thereof,

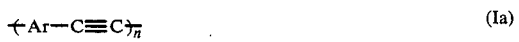

wherein Ar represents an aromatic conjugated group, and n is 10 or more, and a method of producing polymers having repeat units of general formula (I),

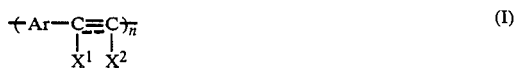

wherein Ar represents an aromatic conjugated group, and $X^1$ and $X^2$ each represent hydrogen or halogen when the bond between the two carbon atoms is a double bond, and when the bond is a triple bond, neither $X^1$ nor $X^2$ exist by the electrochemical reduction of a monomer having general formula,

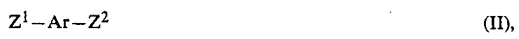

wherein Ar is the same as that defined in the above formula (I), and $Z^1$ and $Z^2$ each represent a methyl halide, are disclosed. These polymers are semiconductive or electroconductive and can be used as an active material of the electrodes of organic secondary batteries.

10 Claims, 7 Drawing Sheets

WAVENUMBER (cm$^{-1}$)

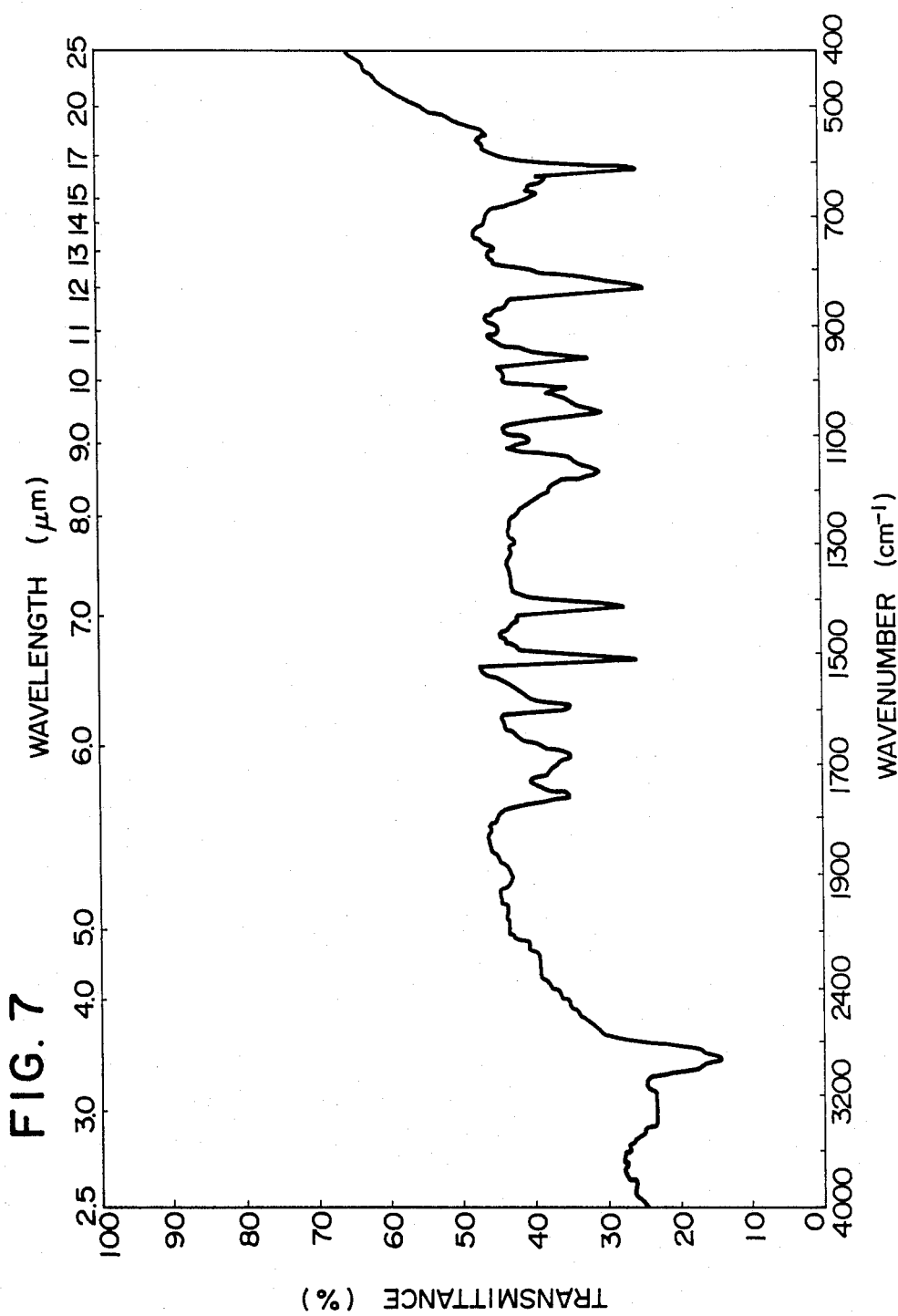

SEMICONDUCTIVE OR CONDUCTIVE POLYMERS, METHOD OF PRODUCING THE SAME AND BATTERIES USING THE POLYMERS AS ACTIVE MATERIALS

BACKGROUND OF THE INVENTION

The present invention relates to semiconductive or conductive polymers, a method of producing the polymers, and batteries using the polymers as active materials.

In recent years many studies on electronic materials have been conducted, and particularly functional polymeric materials using conjugated polymers attract attention because of their various feasibilities in the application. It is known that complex compounds formed by doping impurities on conjugated polymeric materials could exhibit electric conductivity comparable to dielectrics, semi-conductors or metals. Though the conduction mechanism is not clarified as yet, various materials expected to be as being functional materials are being studies.

Heretofore various polymeric materials such as polyparphenylene, polythiophene, polypyrrole, polyacetylene and derivatives thereof have been studied as reported in Japanese Laid-Open Patent Applications Nos. 61-4165 and 56-136469 and Journal of Polymer Science, Polymer Chemical Edition, Vol. 12. p.11-20. However, these polymeric materials do not have sufficient electroconductive characteristics for use in practice. No polyyne polymers having such electroconductive characteristics have been reported as yet.

Polyaromatic vinylene compounds represented by the following general formula (I) have been reported. Specifically, the syntheses and properties of polyphenylene vinylene and polthienylene vinylene are reported in Japanese Laid-Open Patent Application No. 61-4165 and Japanese Laid-Open Patent Application No. 61-148231, respectively.

wherein Ar is a conjugated group.

It has been found that these aromatic vinylene compounds as well as other conjugated compounds are feasible for doping with impurities, and both n-type and p-type dopings are avaiable by the gas doping using a gas such as $SO_3$, or by the electrolytic ion doping through an electrochemical method. The materials obtained by these methods are promising as new electronic materials with many applications.

In a method of producing these polymers, a sulfonium salt polymer having the following formula (II) is pyrolyzed to produce a polyaromatic vinylene compound, which requires a prolonged synthesizing process.

where R represents an alkyl group, and Y represents an anion.

As a method of producing conjugated polymers such as polypyrrole, there is known an electrochemical polymerization method which utilizes an electrochemical method. In this method, an electric current is caused to flow through an solution of a monomer and an electrolyte, whereby a polymer is formed on an electrode. By this method, an electroconductive polymer can be obtained substantially by a single step, without addition of a secondary doping operation. When the electroconductive polymer is obtained in the form of a film, this method has the advantage that the thickness of the polymer film can be adjusted by controlling the applied electric current. The polymers studied by the electrolytic polymerization are such polymers that have been formed on the surface of an anode.

However, it is extremely difficult to synthesize polyaromatic vinylene compounds in which an aromatic unit such as phenylene, thienylene and furanylene, and a vinylene group are alternately bonded to each other, by the electrochemical polymerization method utilizing anodic oxidation. As a matter of fact, we are not aware of any reports concerning such synthesis.

It is reported that partial cathodic reduction was employed for polymerization. However, the polymers obtained by this reduction have a low electric conductivity and it is difficult to grow the polymers in the form of a thick film on the electrode.

Further, besides the above-mentioned polyene compounds, conjugated polyyne compounds such as polydiacetylene are synthesized as functional polymers mainly by solid phase polymerization and LB film formation technique (Lamgmuir-Brodgett's technique). However, there has been no report concerning the synthesis of a polymeric compound containing as the main chain a polyyne in which an aromatic unit such as phenylene group, and —C≡C— group are alternately bonded to each other.

Furthermore, there has been reported no organic battery using a polyyne compound as the active material thereof.

SUMMARY OF THE INVENTION

It is therefore an object of the present invention to provide semiconductive or conductive organic polymers.

Another object of the present invention is to provide a method of producing semiconductive or conductive organic polymers by electrochemical reduction.

A further object of the present invention is to provide a method of producing semiconductive or conductive organic polymers by electrochemical reduction with the content of halogen remaining in the polymers being controlled.

Still another object of the present invention is to provide an organic battery with excellent stability and characteristics.

The first object of the present invention is attained by the polymers which have repeat units represented by the following general formula (Ia) in the main chain:

wherein Ar represents an aromatic conjugated group, such as a linear aromatic conjugated group, and a fused ring aromatic conjugated group.

The second object of the present invention is attained by the method of polymerizing a monomer having general formula (II) by electrochemical reduction to form a polymer having repeat units having general formula (I) in the main chain:

$$Z^1-Ar-Z^2 \qquad (II)$$

wherein Ar represents an aromatic conjugated group, such as a linear aromatic conjugated group, and a fused ring aromatic conjugated group, and $Z^1$ and $Z^2$ each represent a methyl halide.

$$\left(Ar-C\overset{\cdots}{\underset{X^1\ X^2}{=}}C\right)_n \qquad (I)$$

wherein the bond between the two carbon atoms is a double bond or a triple bond, Ar is the same as that defined in the above formula (II), and $X^1$ and $X^2$ each represent hydrogen or halogen when the bond between the two carbon atoms is a double bond, and when the bond is a triple bond, neither $X^1$ nor $X^2$ exists.

The third object of the present invention is attained by the above-mentioned electrochemical reduction in the presence of a carbonyl metal complex.

The fourth object of the present invention is achieved by using as an active material for the electrodes of the battery a polyyne compound containing triple bonds in the main chain, preferably a polymer having repeat units represented by the first mentioned general formula (Ia) in the main chain:

$$(Ar-C\equiv C)_n \qquad (Ia)$$

wherein Ar represents an aromatic conjugated group, such as a linear aromatic conjugated group, and a fused ring aromatic conjugated group.

BRIEF DESCRIPTION OF THE DRAWINGS

In the drawings,

FIG. 7 is an infrared spectrum of the polymer obtained in Example 11 according to the present invention.

DETAILED DESCRIPTION OF THE PREFERRED EMBODIMENTS

Figure 1:
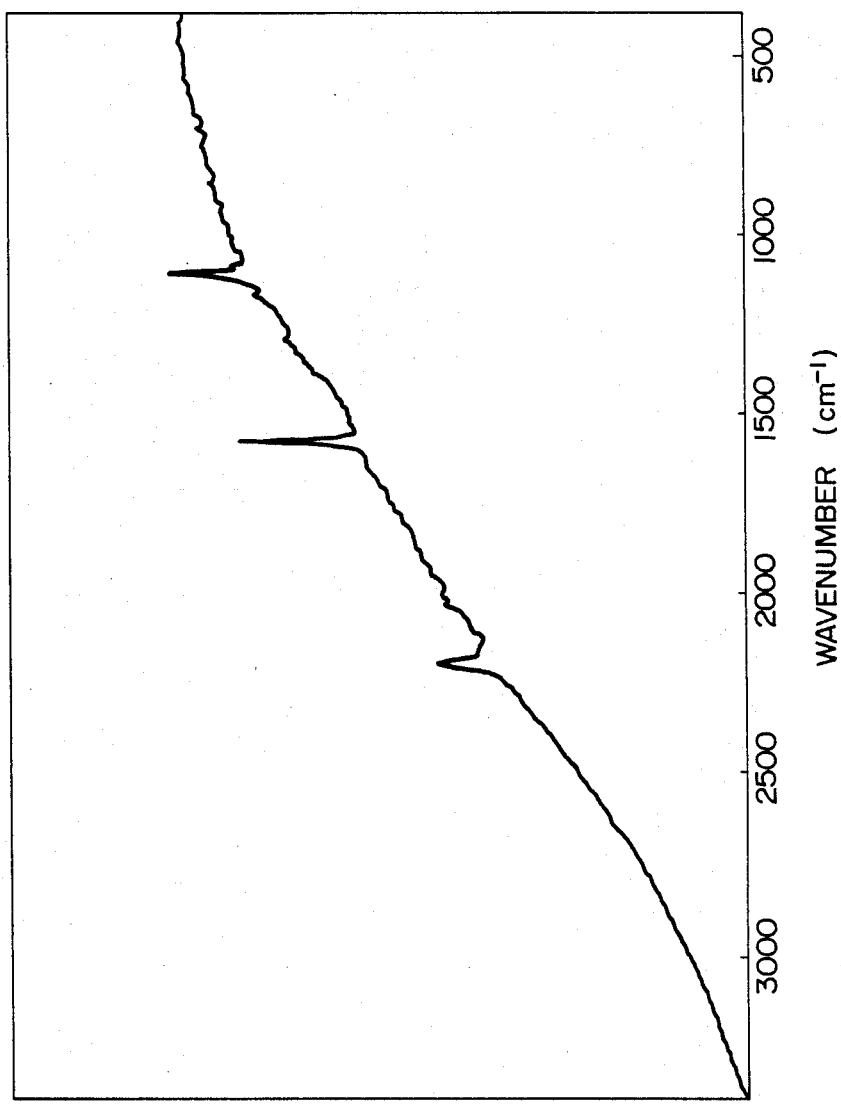
FIG. 1 is a Raman spectrum of a polymer obtained in Example 3 according to the present invention.

As mentioned previously, the semiconductive and conductive polymers according to the present invention have repeat units represented by the following general formula (Ia) in the main chain:

$$(Ar-C\equiv C)_n \qquad (Ia)$$

wherein Ar represents an aromatic conjugated group, such as a linear aromatic conjugated group, and a fused ring aromatic conjugated group, and n an integar, preferably 10 or more.

Specific examples of a linear aromatic conjugated group are phenylene such as (for example, diphenylene and terphenylene), where m is an integer and X represents, for example, S, O or NH.

Specific examples of a fused ring aromatic conjugated group are:

where X and X' each represent, for example, X, O or NH.

In the general formula (Ia), the degree of polymerization, n, is not limited to a particular number, but 10 or more is appropriate to obtain a semiconductor which is insoluble and non-fusible polymer.

Stable films with excellent film-forming properties and such electrochemical activity that causes reversible stabilization of dopants inside the polymers can be made of the polymers according to the present invention. In particular, the polyyne compounds are partly or totally crystallizable and their electric conductivity can be varied depending upon the doping, which can be, for instance, set in the range of 100 to $10^{-5}$ S/cm. In particular, a film of a polyyne compound formed on an electrode made of copper changes its color from yellow to black at an electric potential of $-2.0$ V or less for an electrode of Ag. The natural electrode potential in this state indicates about $-0.9$ V, and the variation of color is reversible as the scanning potential is changed.

The polymers according to the present invention have high electric conductivity corresponding to semiconductors or conductors and the light-absorption characteristics thereof reversibly change in accordance with the doping or dedoping of dopants. Therefore, the polymers according to the present invention can be used, for instance, as the active materials of the electrodes of batteries, particularly of a secondary battery, electrode materials, electromagnetic shielding materials, and pn-junction elements.

The polymers having repeat units of general formula (I),

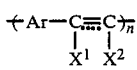
(I)

wherein Ar represents an aromatic conjugated group, and $X^1$ and $X^2$ each represent hydrogen or halogen when the bond between the two carbon atoms is a double bond, and when the bond is a triple bond, neither $X^1$ nor $X^2$ exists, can be obtained by the electrochemical reduction of a monomer having general formula (II)

$$Z^1-Ar-Z^2 \quad (II)$$

wherein Ar is the same as that defined in the above formula (I), and $Z^1$ and $Z^2$ each represent a methyl halide.

In the above polymerization method, the polymers represented by the previously given general formula (Ia) can be obtained by polymerizing the monomers represented by the above formula (II) in which $Z^1$ and $Z^2$ are a methyl trihalide.

Specific examples of a methyl halide represented by $Z^1$ and $Z^2$ are $-CH_2Cl$, $-CHCl_2$, $-CCl_3$, $-CH_2Br$, $-CHBr_2$, and $-CBr_3$. In particular, when $Z^1$ and $Z^2$ are a methyl dihalide or a methyl trihalide in the formula (II), the polymer can be easily produced in the form of a film. As mentioned above, when $Z^1$ and $Z^2$ are a methyl trihalide in the formula (II), polyyne compounds having a

group can be obtained

When $Z^1$ and $Z^2$ are a methyl monohalide or a methyl dihalide, the obtained polymer has in the main chain the repeat units having the formula:

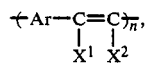
(Ib)

while when $Z^1$ and $Z^2$ are a methyl trihalide, the obtained polymer has in the main chain the repeat units having

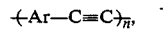
(Ia)

as mentioned above. In this case, by changing the polymerization conditions, the ratio of the repeat units of (Ia) to the repeat units of (Ib) can be controlled. For instance, when an identical monomer is employed, if tetrahydrofuran is employed as the solvent for the electrochemical polymerization, a polymer having in the main chain the repeat units of the formula (Ib) can be obtained, when propylene carbonate is used as the solvent, a polymer having in the main chain the repeat units of the formula (Ia) can be obtained.

By polymerizing the monomer represented by the formula (II) with reduction of the monomer, particularly with electrochemical reduction of the monomer, a semiconductive or conductive polymer can be obtained.

This electrochemical method is generally represented, for example, in J. Electrochem. Soc., Vol. 130, No. 7, 1506 ~ 1509 (1983), Electrochem. Acta., Vol. 27, No. 1, 61 ~ 65 (1982), and J. Chem. Soc., Chem. Commun., 1199 (1984).

In the present invention, the reduction of the monomer and simultaneous release of reducing groups proceed the polymerization reaction. In the present invention, this polymerization reaction is caused to take place by placing in an electrolytic cell a solution of a monomer having the above-mentioned formula (II), an electrolyte and a solvent, immersing a pair of anode and cathode electrodes in the solution and causing electric current to flow across the electrodes. As a result, a film-like or fiber-like polymer is formed on the surface of the anode electrode. The thickness of the polymer can be controlled by the quantity of the electrode caused to pass across the electrodes.

In the present invention, the following electrolyte salts can be employed as the above-mentioned electrolyte: tetramethylammonium perchlorate, tetraethylammonium perchlorate, tetrabutylammonium perchlorate, tetramethylammonium tetrafluorborate, tetraethylammonium, tetrafluorborate, tetrabutylammonium tetrafluoborate, lithium perchlorate, lithium tetrafluoborate, tetramethylammonium hexafluoarsenate, tetraethylammonium hexafluoarsenate, tetrabutylammonium hexafluoarsenate, sodium hexafluoarsenate, tetramethylammonium hexafluorophosphate, tetrabutylammonium hexafluorophosphate, sodium hexafluorophosphate, sulfuric acid, tetramethylammonium hydrogensulfate, tetrabutylammonium hydrogensulfate, sodium trifluoroacetate, tetramethylammonium p-toluene sulfonate, and tetrabutylammonium p-toluene sulfonate.

Particularly, good results are obtained by using a combination of tetrabutylammonium salts as cation and tetrafluoride or phosphorous hexafluoride as anion.

As the solvent, it is preferable to use a polar solvent after refining treatment of dehydragtion and degassing. Preferable examples of such a polar solvent are tetrahydrofuran, hexamethylphosphoramide, dimethoxyethane, acetonitrile, propylene carbonate, nitrobenzene, benzonitrile, methylene chloride, dimethylformamide, and dimethyl sulfoxide. Of these solvents, tetrahydrofuran, dimethoxy ethane and propylene carbonate are particularly preferable for use in the present invention.

In the present invention, the above reduction polymerization can be performed in the presence of a carbonyl metal complex. Preferable examples of a carbonyl metal complex for use in the present invention are $Fe(CO)_5$, $Co(CO)_8$, $Cr(CO)_6$, $Mo(CO)_6$, $V(CO)_6$, $W(CO)_6$, $Mn_2(CO)_6$, $Ni(CO)_4$, $Pt(CO)_4$, and organic compound coordinated carbonyl metal complexes such as $C_6H_6Cr(CO)_3$. Carbonyl chrome complexes and carbonyl molybdenum complexes are particularly preferable for use in the present invention.

It is preferable that the amount of such a carbonyl metal complex be 2 m mol/l or more, more preferably in the range of 5 to 15 m mol/l.

As the electrodes for the electrochemical polymerization, metal electrodes made of a metal such as Cu, Ag, Au, Pt, Ni, Zn, Sn or Al; carbon electrodes made of, for example, glassy carbon; and metal oxide electrodes made of, for example, ITO can be employed.

When a polymer having the main chain including —C≡C— bonds is synthesized, it is preferable to use a glass electrode with a metal oxide such as indium (III) oxide and tin (IV) oxide vacuum-deposited thereon. In contrast to this, when a polymer having the main chain including —C≡C— bonds is synthesized, it is preferable to use a metal electrode made of, for example, Cu or Pt.

As the reaction atmosphere, an inert gas atmosphere of nitrogen, argon, etc. is preferable to proceed the reaction.

The electrochemical polymerization proceeds in any of constant current, constant potential and constant voltage electrochemical polymerization methods, but of these methods, the constant potential electrochemical polymerization is preferable. It is preferable to apply a potential of $-1$ V or less, more preferably a potential ranging from $-2$ V to $-10$ V, to a working electrode when a standard electrode of Ag/Ag$^+$ is employed.

The present invention will now be explained in detail with reference to the following examples, which are given for illustration of the invention and are not intended to be limiting thereof.

EXAMPLE 1

In an electrolytic cell equipped with a Cu anode and a Cu cathode, there was placed a solution of

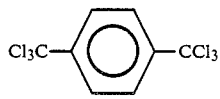

(47 m mole) as monomer and [(n—Bu)$_4$N]$^+$ClO$_4^-$ (0.1 mole) (wherein Bu represents a butyl group) dissolved in propylene carbonate. The electrochemical polymerization was conducted at a constant potential of $-2$ V vs. Ag/Ag$^+$ in an Ar atmosphere, so that a film of a polymer comprising polyyne units containing triple bonds in the main chain was produced. The results of the elemental analysis of the film and the data of the properties of the film are shown in Table 1.

EXAMPLE 2

Example 1 was repeated except that a Pt anode and a Pt cathode were employed instead of the Cu anode and cathode and the electrochemical polymerization was performed at a constant potential of $-5$ V vs. Ag/Ag$^+$, so that a film of a polymer comprising polyyne units containing triple bonds in the main chain was produced.

The results of the elemental analysis of this polymeric film and the property data thereof are shown in Table 1.

EXAMPLE 3

In an electrolytic cell equipped with a Cu anode and a Cu cathode, there was placed a solution of

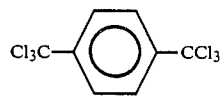

(47 m mole) as monomer and [(n—Bu)$_4$]$^+$·BF$_4^-$ (0.1 mole) dissolved in propylene carbonate. The electrochemical polymerization of the monomer was then performed at a constant potential of $-2$ V vs. Ag/Ag$^+$ in an Ar atmosphere, so that a film of a polymer comprising polyyne units containing triple bonds in the main chain was produced.

The results of the elemental analysis of this polymeric film and the property data thereof as shown in Table 1.

Figure 2:
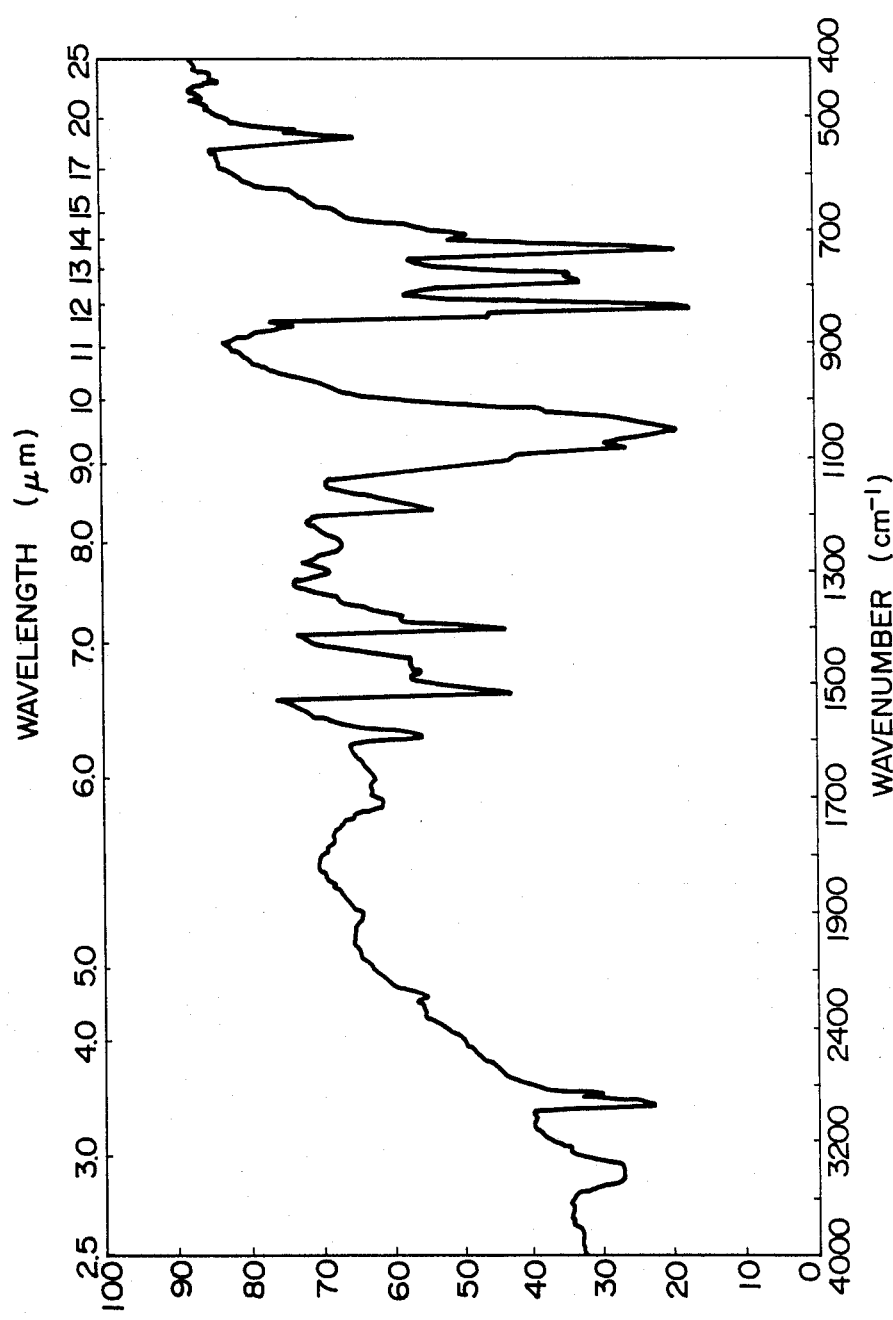
FIG. 2 is an infrared spectrum of the polymer obtained in Example 3 according to the present invention.

A Raman spectrum and an infrared spectrum of this polymer are shown in FIGS. 1 and 2, respectively.

EXAMPLE 4

In an electrolytic cell equipped with a Pt anode and Pt cathode, there was placed a solution of

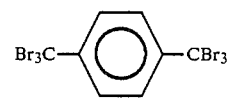

(47 m mole) as monomer and [(n—Bu)$_4$]$^+$·ClO$_4^-$ (0.1 mole) dissolved in tetrahydrofuran, and the electrochemical polymerization of the monomer was performed under the same conditions as in Example 1, whereby a polymeric film was obtained.

The results of the elemental analysis of this polymeric film and the property data thereof are shown in Table 1.

The content of the triple bonds in this polymer was smaller than the contents of the triple bonds in the polymer obtained in Example 1 to 3.

TABLE 1

|  |  | Example 1 | Example 2 | Example 3 | Example 4 |
|---|---|---|---|---|---|
| Elemental | C | 78.50 | 78.41 | 78.52 | 76.51 |
| Analysis | H | 4.20 | 4.18 | 4.21 | 3.35 |
|  | N | 0 | 0 | 0 | 0 |
|  | Br | — | — | — | 20.01 |
|  | Cl | 8.72 | 8.77 | 8.70 | — |
| Degree of Polymerization n *1 |  | 21.2 | 21.0 | 21.30 | 18.0 |
| Raman spectrum —C≡C— |  | 2200 cm$^{-1}$ | 2200 cm$^{-1}$ | 2200 cm$^{-1}$ | 2160 cm$^{-1}$ |
| Electric Conductivity (S/cm) *2 |  | 1.21 × 10$^{-8}$ | 0.81 × 10$^{-8}$ | 3.62 × 10$^{-6}$ | 2.2 × 10$^{-9}$ |

*1 Theoretically calculated from the quantity of the flowed electric current based on the supposition that the formula of the polymer is X$^3$—C+C$_b$-H$_4$—C≡C)$_n$C$_6$H$_4$CX$^3$.
*2 Measured by the 2-terminal bridge circuit method.

APPLICATION EXAMPLE

Figure 3:
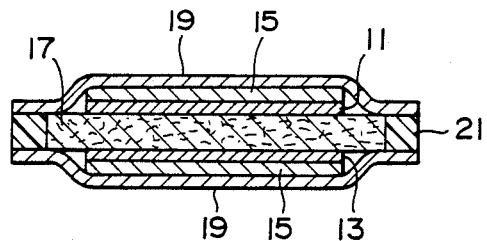
FIG. 3 is a schematic cross-sectional view of a secondary battery in which a polymer according to the present invention is employed as an active material for the electrode.

Using the polymeric film obtained in Example 1, a thin sheet-like organic secondary battery with the structure as shown in FIG. 3 was constructed.

The polymeric film in Example 1 was clad on Ni foils (collector) 15, 15 as an anode-active material 11 and a cathod-active material 13, so that an anode and a cathode were respectively formed. A separator 17 was made of a polypropylene non-woven fabric. As an electrolyte solution, LiBF$_4$ (1 mole)/propylene carbonate was used. A sheathing film 19, 19 was made of a 120 μm thick biaxially oriented film, and a sealing material 21 was made of Toray Chemistat R99.

External electrodes were formed by spot welding of Ni wires onto the Ni foil collectors 15, 15.

The evaluation of this battery was made with respect to the open-circuit voltage and theoretical energy density. The result was that the open-circuit was 1.4 V, and the theoretical energy density was 64 Wh/kg.

There evaluations were performed:

(1) Open-circuit voltage:
The terminal voltage between the two electrodes was measured 10 minutes after recharging.

(2) Theoretical energy density:
This was measured by recharging and discharging with a constant current (0.3 mA).

EXAMPLE 5

0.2 g of $\alpha,\alpha,\alpha',\alpha'$-tetrebromo-p-xylene and 0.33 g of tetrabutylammonium tetrafluoroborate were dissolved in 10 ml of dehydrated and degassed tetrahydrofuran.

A working electrode made of ITO glass with a size of 1 cm×2 cm, a counter electrode made of Pt, and a reference electrode of Ag/Ag$^+$ were immersed in the above solution.

The electrochemical polymerization of the tetrabromo-p-xylene was performed at a voltage $-3.0$ V vs. Ag/Ag$^+$ in an Ar atmosphere for 7 hours. As a result, a yellow polymeric film was formed on the surface of the ITO glass cathode.

A voltage of $\pm 0$ V vs. Ag/Ag$^+$ was applied to the polymeric film until the electric current dropped to 0.05 mA or less, then the film was washed withe acetone and dried, whereby a polymeric film with a weight of 5.0 mg and a thickness of 30 $\mu$m was obtained. The electric conductivity of the film was $1 \times 10^{-4} \sim 10^{-9}$ S/cm.

Figure 4:
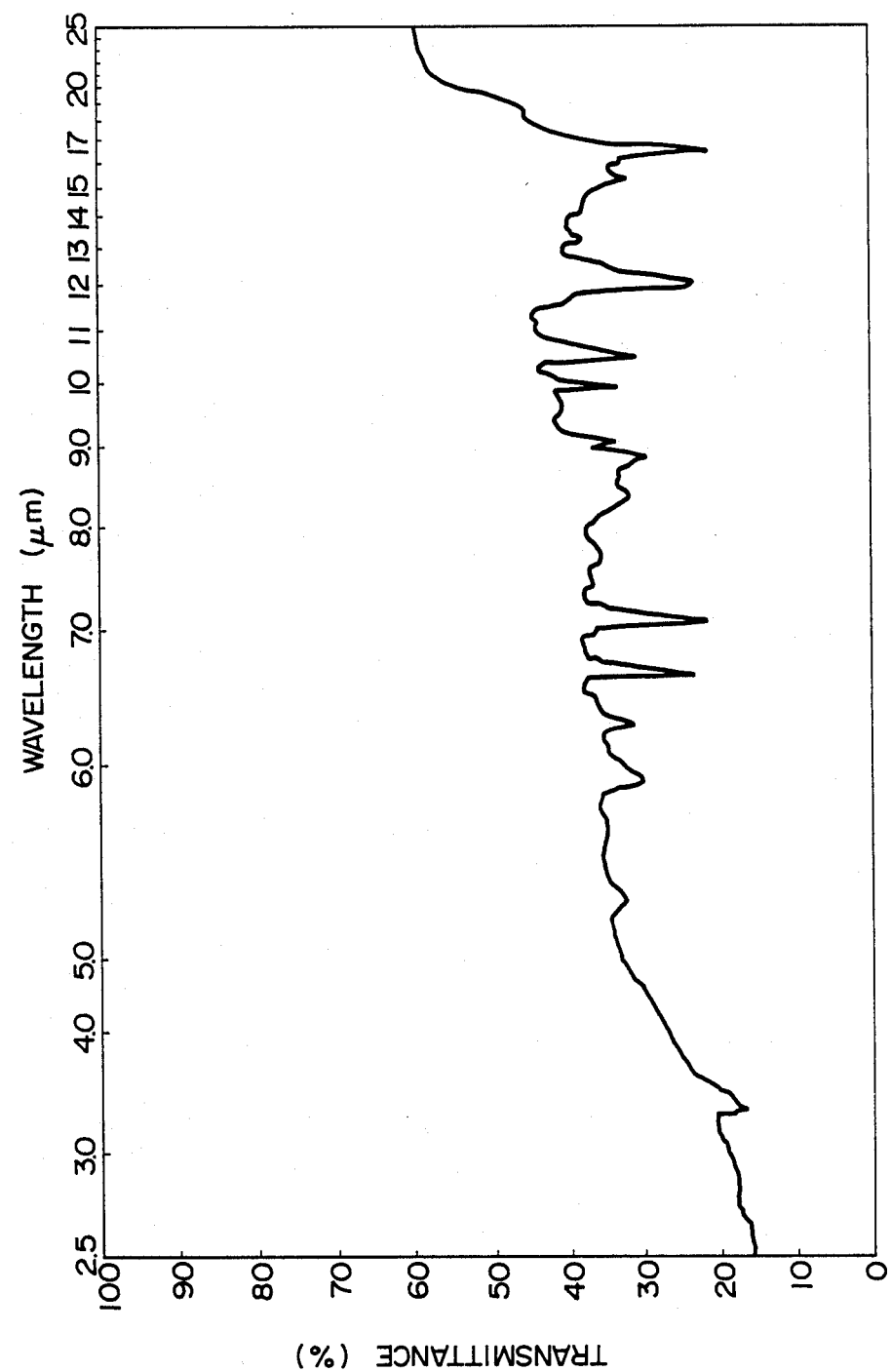
FIG. 4 is an infrared spectrum of the polymer obtained in Example 3 according to the present invention.

The infrared spectrum of the polymeric film is shown in FIG. 4. From the infrared spectrum and the elemental analysis, it was found that the film has following main chain and bromine atoms are contained with a ratio of not more than 1 per one unit (n=1):

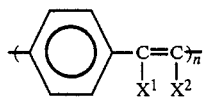

wherein $X^1$ and $X^2$ each represent H or Br.

EXAMPLE 6

Example 5 was repeated except that 10 ml of dimethoxyethane was employed instead of tetrahydrofuran.

The polymerization was performed at a voltage of $-3.0$ V vs. Ag/Ag$^+$ for 4 hours. As a result, a polymeric film having a weight of 1.6 mg and a thickness of 10 $\mu$m was obtained. This polymeric film comprised phenylene vinylene units in the main chain as in the polymeric film obtained in Example 5.

EXAMPLE 7

0.16 g of $\alpha,\alpha,\alpha',\alpha'$-hexachloro-p-xylene and 0.33 g of tetrabutylammonium tetrafluoroborate were dissolved in 10 ml of dehydrated and degassed tetrahydrofuran.

A working electrode made of ITO glass with a size of 1 cm×2 cm, a counter electrode made of Pt, and a reference electrode of Ag/Ag$^+$ were immersed in the above solution. The electrochemical polymerization of hexachloro-p-xylene was performed at a voltage of $-3.0$ V vs. Ag/Ag$^+$ in an Ar atmosphere for 4 hours.

A voltage of $\pm 0$ V vs. Ag/Ag$^+$ was applied to the polymeric film until the current dropped to 0.05 mA or less, then the film was washed with acetone and dried, whereby a polymeric film with a weight of 0.5 mg and a thickness of 3 $\mu$m was obtained.

The thus obtained polymer contains not only double bonds, but also triple bonds in the main chain thereof.

EXAMPLE 8

Example 7 was repeated except that dehydrated and degassed dimethoxyethane was employed instead of tetrahydrofuran and the electrochemical polymerization was performed at a voltage of $-3.0$ V vs. Ag/Ag$^+$ in an Ar atmosphere for 5 hours, whereby a polymeric film having a weight of 0.5 mg and a thickness of 3 $\mu$m was obtained.

The thus obtained polymer comprises phenylene vinylene units in the main chain thereof as in the polymer obtained in Example 5.

EXAMPLE 9

0.2 g of $\alpha,\alpha,\alpha',\alpha'$-tetrabromo-p-xylene, 0.33 g of tetrabutylammonium tetrafluoroborate, and 26 mg of Mo(CO)$_6$ were dissolved in 10 ml of dehydrated and degassed tetrahydrofuran.

A working electrode made of ITO glass with a size of 1 cm×2 cm, a counter electrode made of Pt, and a reference electrode of Ag/Ag$^+$ were immersed in the above solution.

The electrochemical polymerization of the tetrabromo-p-xylene was performed at a voltage $-3.0$ V vs. Ag/Ag$^+$ in an Ar atmosphere for 6 hours. As a result, a yellow polymeric film was formed on the surface of the ITO glass cathode.

A voltage of $\pm 0$ V vs. Ag/Ag$^+$ was applied to the polymeric film for 20 minutes, then the film was washed with acetone and dried, whereby a polymeric film with a weight of 2.72 mg and a thickness of 22 $\mu$m was obtained.

The electric conductivity of the film was $1 \times 10^{-9}$ S/cm.

Figure 5:
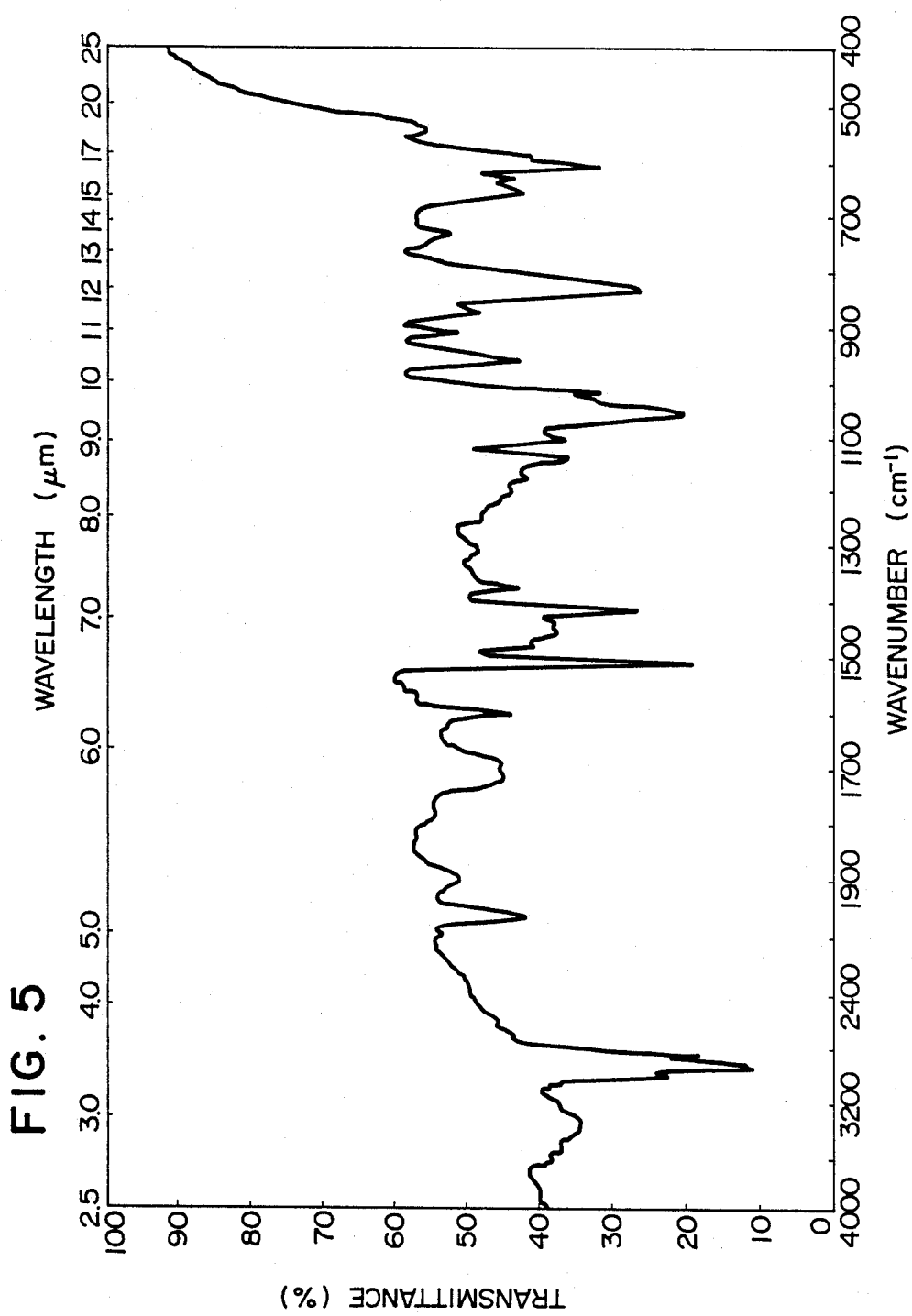
FIG. 5 is an infrared spectrum of a polymer obtained in Example 9 according to the present invention.

An infrared spectrum of the polymeric film is shown in FIG. 5.

Figure 6:
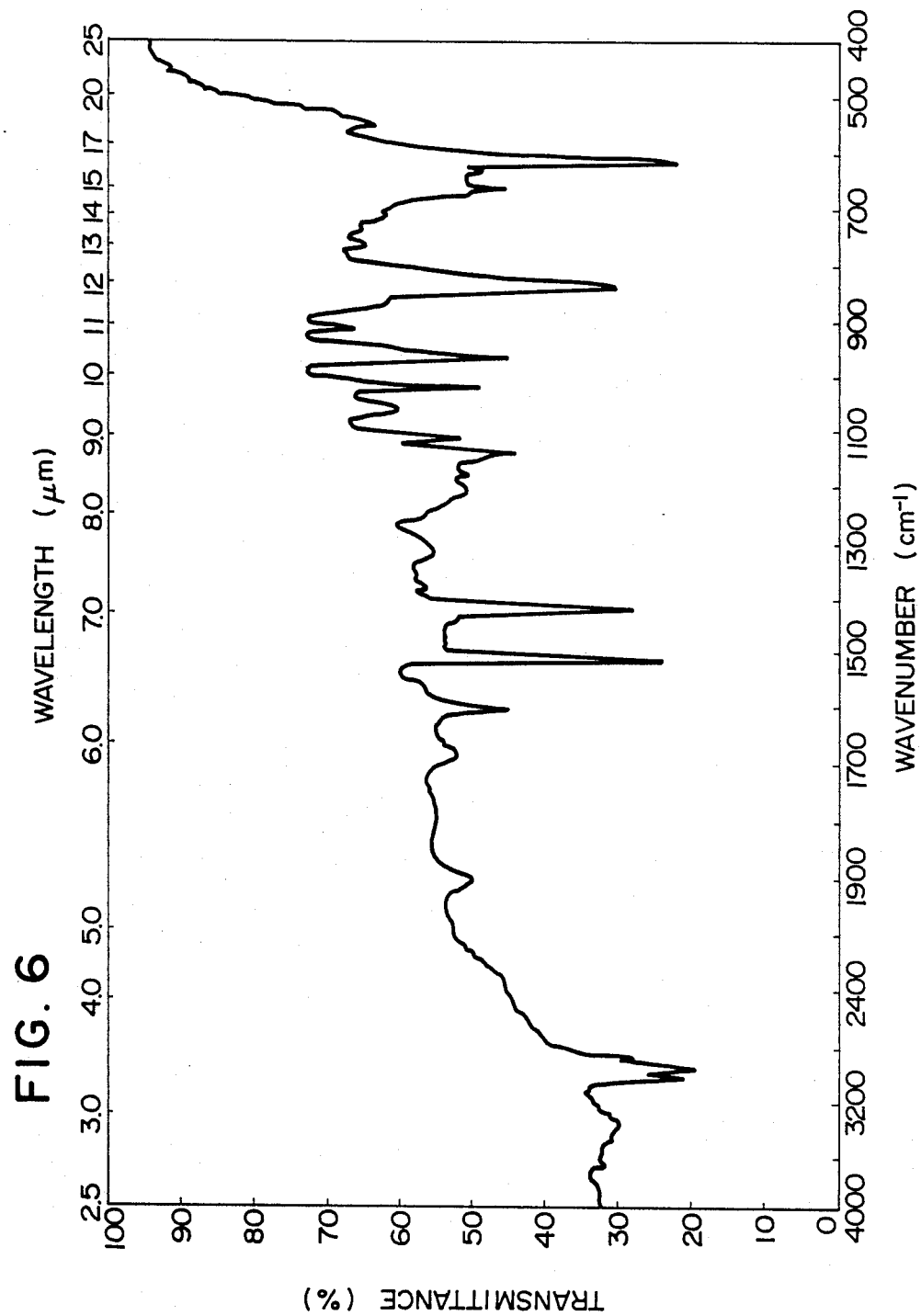
FIG. 6 is an infrared spectrum of a polymer obtained by repeating the same procedure as in Example 9 except that $Mo(CO)_6$ was not used.

For comparison, the above Example 9 was repeated except that Mo(CO)$_6$ was not employed in the solution of the monomer, whereby a polymeric film was obtained. An infrared spectrum of this polymeric film is shown in FIG. 6. When the infrared spectrum in FIG. 5 and the infrared spectrum in FIG. 6 are compared, it is seen that an absorption near 620 cm$^{-1}$ which indicates the stretching vibration of the C—Br bond is reduced in the polymer obtained in Example 9 by the addition of Mo(CO)$_6$.

An elemental analysis of the polymer obtained in Example 9 and the above comparative polymer indicated that the content of Br in the former polymer was 21.08%, and the content of Br in the latter comparative polymer was 43.35%.

EXAMPLE 10

Example 9 was repeated except that Mo(CO)$_6$ employed in Example 9 was replaced by 22 mg of Cr(CO)$_6$, whereby a polymeric film having a weight of 1.61 mg and a thickness of 24 $\mu$m was obtained.

EXAMPLE 11

Example 9 was repeated except that Mo(CO)$_6$ employed in Example 9 was replaced by 21 mg of C$_6$H$_6$Cr(CO)$_3$, whereby a polymeric film having a weight of 0.82 mg and a thickness of 23 $\mu$m was obtained. An infrared spectrum of this polymeric film is shown in FIG. 7.

EXAMPLE 12

Example 9 was repeated except that $Mo(CO)_6$ employed in Example 9 was replaced by 20 mg of $Fe(CO)_5$, whereby a polymeric film having a weight of 1.68 mg was obtained.

EXAMPLE 13

Example 9 was repeated except that $Mo(CO)_6$ employed in Example 9 was replaced by 34 mg of $Co_2(CO)_8$, whereby a polymeric film having a weight of 0.41 mg was obtained.

The polyyne compounds according to the present invention can also be employed as the active electrode material for batteries.

A battery in which such a polyyne compound is used in the electrodes thereof, particularly as cathode-active material, will now be explained.

In recent years various kinds of organic secondary batteries using polymers with conjugated double bonds are proposed. For example, organic secondary batteries using polyacetylene are proposed, for example, in J. Chem. Soc., Chem. Commun., (1981) 317, J. Electrchem. Soc., 128 (1981) 1651.

Further, a battery using polyphenylene as an active material is reported in J. Chem. Soc., Chem. Commun., (1981) 361–362; a battery using polypyrrole is disclosed in Japanese Laid-Open Patent Application No. 61-216470: and a battery using polyaniline is in French Patent No. 2553581.

However, none of the foregoing batteries achieves satisfactory results with respect to the energy density and self-discharge unless a lithium cathode is used. Under such circumstances, the development of a stable and highly efficient cathode-material is one of the essential themes to materialize all organic secondary batteries.

Nevertheless, the polymeric materials that can be used as cathode-material are limited to such polymers as polacetylene, polyparaphenylene and polythiophene. Polyacetylene, however, is unstable when formed into a film, and the self-discharge of a battery using polyacetylene as an active material is large. Polyparaphenylene is generally in the form of powder and therefor difficult to work into a film. Polyparaphenylene has also some problems with respect to the self-discharge. Polythiophene also has the shortcoming that the self-discharge is great. Namely, conventional conjugated polyene compounds indicate large self-discharge in particular, and, therefore, cations are not readily stabilized inside these polymers and cathode-active materials eligible for organic secondary battery are not obtained as yet.

The polyyne compounds prepared by the electrochemical polymerization process are available in the form of stable films with excellent film-forming properties and electrochemical activity, and, therefore, suitable for active materials of electrodes in light-weight, thin type organic secondary battery. The polyyne compounds are applicable to both of the anode and cathode of batteries, particularly having excellent cathode characteristics and reversible stabilization of metal ions inside the polyyne compounds.

Active materials of other than polyyne compounds are applicable to either anode or cathode. As for anode, for example, polymers made of, for example, acetylene, pyrrole, aniline, diphenyl benzidine and their derivatives; or polymer complex compounds made of the above materials and electrolytic anions; or activated carbon fibers and phthalocyanine are available. Nevertheless, it is preferable to employ polymers prepared by the electrochemical polymerization process for thin type batteries.

Since the voltage of a battery is the electric potential difference between its anode and cathode, a choice and a combination of active materials for the anode and cathode with appropriate potentials are required. From these points of view, a secondary battery in which are polyyne compound is used for the cathode-active material, and a polymer of pyrrole, aniline, diphenyl benzidine, or derivatives thereof is used for the anode-active material, is most desirable in view of its performance and production.

The battery of this present invention basically comprises an anode, a cathode and an electrolytic solution, and when necessary, each of the anode and cathode is formed insuch a fashion that a current collector carries thereon an active material. A separator can be interposed between these cathode and anode electrodes. The electrolytic solution comprises a solvent and an electrolyte. A solid elecrolyte can be also used as the electrolyte.

In the battery of the present invention, each active material for the anode and cathode electrodes stores energy by doping of anions and cations and release its energy through its external circuit by dedoping. Because of the reversible doping-dedoping process, the battery of the invention can be used as secondary battery.

As such dopants, the following anions and cations can be given. Specifically anions which form p-type conductive polymers or cations which form n-type conductive polymers are indicated as follows:

(i) Anions: Va-series halogenated anions such as $PF_6^-$, $SbF_6^-$, $AsF_6^-$ and $SbCl_6^-$; IIIa-series halogenated anions such as $BF_4^-$; and perchloric acid anions such as $ClO_4^-$.

(ii) Cations: alkaline metal ions such as $Li^+$, $Na^+$ and $K^+$, and $(R_4N)^+$ wherein R represents a hydrocarbon group having 1 to 20 carbon atoms.

Specific examples of compounds which provide the above-mentioned dopants are $LiPF_6$, $LiSbF_6$, $LiAsF_6$, $LiClO_4$, $NaClO_4$, $KI$, $KPF_6$, $KBbF_6$, $KAsF_6$, $KClO_4$, $[(n-Bu)_4N]^+ \cdot AsF_6^-$, $[(n-Bu)_4N]^+ ClO_4^-$, $LiAlCl_4$, $LiBF_4$.

As the solvent of the electrolytic solution in the battery, non-proton type solvents with large dielectric constant, the so-called "polar non-proton type solvents", are preferable; practically, for example, ketones, nitriles, esters, ethers, carbonates nitro compounds, sulfolane compounds or their mixed solvents, preferably nitriles, carbonates and sulfolane compounds among them, are used. Representative examples of such solvents are acetonitrile, propionitrile, butyronitrile, valeronitrile, benzonitrile, ethylene carbonate, propylene carbonate, γ-butyrolacetone, sulfonlane and 3-methyl sulfolane.

As the battery electrodes, electrodes are preferable for use in which a sheet of Al, Ni, Pt, Au or Ag, serving as current collector is attached firmly or applied by an adhesive to a polymer serving as active material, or any of such metals is deposited on the sheet by vacuum deposition or sputtering.

Moreover, a current collector made of pyrrole, which was separately applied for a patent by the present applicant (Patent Application No. 23854-1985), can be used.

As the separator, glass fiber filters, polymer pore filters made of polyester, Teflon, Polyflon and polypropylene, or non-woven fabric comprising glass fiber and any of the above-mentioned polymers are used.

A stable, thin-type and light-weight battery can be obtained by using polyyne compounds as the active material for the electrodes thereof.

Production Example 1 (polyyne compound)

In an electrolytic cell using a Cu anode electrode and a Cu cathode, there was placed a solution of

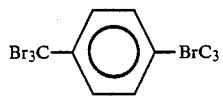

(47 m mole) as monomer and $[(n-Bu)_4N]^+ \cdot ClO_4^-$ (0.1 mole) (wherein Bu represents a butyl group) dissolved in propylene carbonate. The electrochemical polymerization of the monomer was performed at a constant potential of $-2$ V vs. Ag/Ag$^+$ in an Ar atmosphere, whereby a polymer having a main chain comprising the polyyne units represented by the following formula,

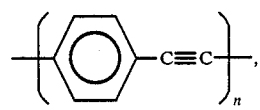

was obtained.

Production Example 2 (polyyne compound)

In an electrolytic cell using a Pt anode and a Pt cathode, there was placed a solution of

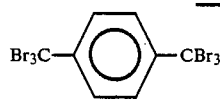

(47 m mole) as monomer and $[(n-Bu)_4N]^+ \cdot BF_4^-$ (0.1 mole) dissolved in propylene carbonate. The electrochemical polymerization of the monomer was performed at $-2$ V vs. Ag/Ag$^+$ in an Ar atmosphere, whereby a polymer having a main chain comprising polyyne units with triple bonds was obtained.

Production Example 3 (prolypyrrole)

In an electrolytic cell using NESA glass (30 ohm/cm$^2$) for the anode and Ni for the cathode, a solution of pyrrole (0.1 mole) and NaAsF$_6$ (0.2 mole) was placed.

The electrochemical polymerization of the monomer was performed at a constant current of 2 mA/cm$^2$, whereby a polypyrrole film was prepared.

Production Example 4 (diphenyl benzidine polymeric film)

In the same electrolytic cell as that employed in Production Example 3, an electrolytic solution of diphenyl benzidine (4 m mole) and tetrabutylammonium perchlorate (0.1 mole) dissolved in acetonitrile was placed. To this solution, lutidine (0.05 mole) was added. Then electrochemical polymerization of diphenyl benzidine was performed at a constant voltage of 3 V, whereby a diphenyl benzidine polymeric film was prepared.

Examples 13 ~ 17

The anode-active materials 11 (6 mg/cm$^2$) and the cathode-active 13 (12 mg/cm$^2$) as shown in Table 2 were clad on Ni foils 15,15 to form anode an cathode electrodes as shown in FIG. 3. Using these electrodes and electrolytic solutions, thin type sheet-like batteries as shown in FIG. 3 comprising a separator 17 made of polypropylene non-woven fabric, an exterior sheath 19 made of a 120 μm thick diaxially oriented polyester film and a sealing material 21 made of Toray Chemistat R99, were produced.

The exterior electrodes were formed by spot welding of Ni wires onto the Ni foil current collector 15.

The characteristics of each battery were evaluated using following evaluation methods:

(1) Open-circuit voltage: the terminal voltage between the two electrodes was measured 10 minutes after recharging, (2) Theoretical energy density: the charging and discharging with a constant current (0.3 mA) were carried out for the measurement.

TABLE 2

|  | Example 14 | Example 15 | Example 16 | Example 17 |
| --- | --- | --- | --- | --- |
| Materials |  |  |  |  |
| Anode-active material | Polyyne compound film in Production Example 1 | Polyyne compound film in Production Example 2 | Polypyrrole film in Production Example 3 | Diphenyl benzidine polymeric film in Production Example 4 |
| Cathode-active material | Polyyne compound film in Production Example 1 | Polyyne compound film in Production Example 2 | Polypyrrole film in Production Example 3 | Polyyne compound film in Production Example 1 |
| Electrolyte solution | LiBF$_4$ (1 mole)/ Propylene carbonate | LiBF$_4$ (1 mole)/ Propylene carbonate | LiBF$_4$ (1 mole)/ Propylene carbonate | LiBF$_4$ (1 mole)/ Propylene carbonate |
| Evaluation |  |  |  |  |
| Open-ciruit voltage (V) | 1.4 | 1.3 | 1.6 | 1.8 |
| Theoretical energy density | 64 | 30 | 87 | 103 |

What is claimed is:

1. A method of producing a polymer having repeating units of the formula (I):

wherein n has a value of at least 10; Ar represents an aromatic conjugated group, and X$^1$ and X$^2$ each represent hydrogen or halogen when the bond between the two carbon atoms is a double bond, and when the bond is a triple bond, neither $X^1$ or $X^2$ exists, by electrochemically reducing a monomer having the formula (II):

 (II)

wherein Ar is the same as that defined in above formula (I), and $Z^1$ and $Z^2$ each represent a methyl halide.

2. The method as claimed in claim 1, wherein said electrochemical reduction is performed in the presence of a carbonyl metal complex.

3. The method as claimed in claim 2, wherein said carbonyl metal complex is employed in said electrochemical reduction is selected from the group consisting of $Fe(CO)_5$, $Co(CO)_8$, $Cr(CO)_6$, $Mo(CO)_6$, $V(CO)_6$, $W(CO)_6$, $Mn_2(CO)_6$, $Ni(CO)_4$, $Pt(CO)_4$, and $C_6H_6Cr(CO)_3$.

4. The method as claimed in claim 3, wherein the amount of said carbonyl metal complex employed in said electrochemical reduction is 2 m mol/l or more.

5. The method as claimed in claim 1, wherein said methyl halide for $Z^1$ and $Z^2$ is selected from the group consisting of $-CH_2Cl$, $-CHCl_2$, $-CCl_3$, $-CH_2Br$, $-CHBr_2$ and $-CBr_3$.

6. The method as claimed in claim 1, wherein when the bond of the produced polymer is a double bond, a glass electrode with metal oxide deposited thereon is used, and wherein when the bond of the produced polymer is a triple bond, a metal electrode is used.

7. The method as claimed in claim 1, wherein said method is effected by applying a potential of $-1V$ or less to a working electrode when a standard electrode of $Ag/Ag^+$ is used.

8. A polymer having repeating units of the formula (Ia) in the main chain thereof:

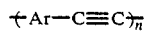 (Ia)

wherein n has a value of at least 10; Ar represents a linear aromatic conjugated group selected from the group consisting of:

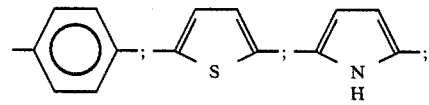

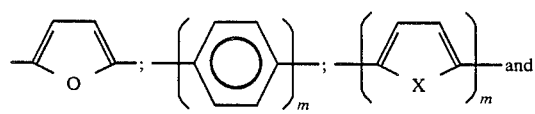

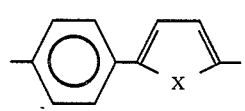

wherein m is an integar, and X represents S, O or NH; or Ar represents a fused ring aromatic group selected from the group consisting of: the group consisting of

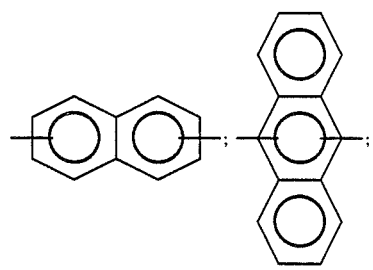

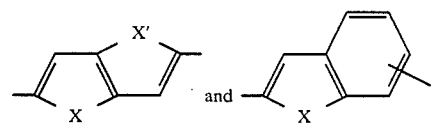

wherein X and X' each represent S, O or NH.

9. A secondary battery comprising an anode, cathode and an electrolytic medium, wherein at least one of said anode or cathode comprises an active material comprising a polymer having repeating units of the formula (I):

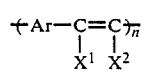 (I)

wherein n has a value of at least 10; Ar represents a linear aromatic conjugated group selected from the group consisting of:

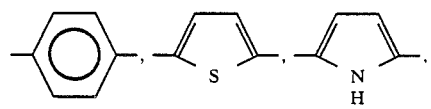

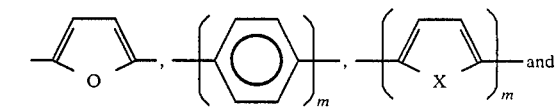

wherein m is an integar, and X represents S, O or NH; or Ar represents a fused ring aromatic group selected from the group consisting of:

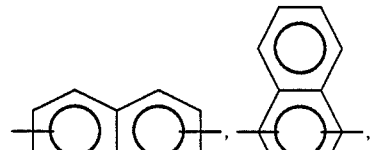

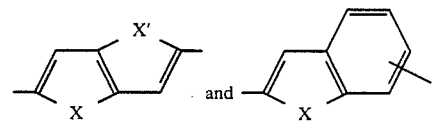

wherein X and X' each represent S, O or NH; and $X^1$ and $X^2$ each represent a halogen atom when the bond between the two carbon atoms is a double bond, and when the bond is a triple bond, neither $X^1$ or $X^2$ exists.

10. The secondary battery was claimed in claim 9, wherein said cathode comprises said active material.

* * * * *